(12) United States Patent
Uchiyama et al.

(10) Patent No.: US 8,800,098 B2
(45) Date of Patent: Aug. 12, 2014

(54) CONNECTING DEVICE FOR WIPER BLADE AND WIPER BLADE HAVING THE SAME

(75) Inventors: Keita Uchiyama, Hamamatsu (JP); Takao Yoshimoto, Toyohashi (JP); Naoki Torii, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 396 days.

(21) Appl. No.: 13/248,848

(22) Filed: Sep. 29, 2011

(65) Prior Publication Data

US 2012/0090125 A1 Apr. 19, 2012

(30) Foreign Application Priority Data

Oct. 14, 2010 (JP) ................... 2010-231603

(51) Int. Cl.
*B60S 1/40* (2006.01)
(52) U.S. Cl.
USPC ...................................... 15/250.32
(58) Field of Classification Search
CPC .... B60S 1/4006; B60S 1/4009; B60S 1/4016; B60S 1/40; B60S 2001/4022; B60S 2001/4029; B60S 2001/4032
USPC ............. 15/250.32, 250.31, 250.351, 250.43, 15/250.44
See application file for complete search history.

(56) References Cited

U.S. PATENT DOCUMENTS

| | | | | |
|---|---|---|---|---|
| 4,670,934 A | * | 6/1987 | Epple et al. | 15/250.32 |
| 5,145,274 A | * | 9/1992 | Schon | 403/79 |
| 5,920,950 A | * | 7/1999 | Young et al. | 15/250.32 |
| 2005/0005387 A1 | | 1/2005 | Kinoshita et al. | |
| 2008/0201892 A1 | * | 8/2008 | Fujiwara et al. | 15/250.32 |

FOREIGN PATENT DOCUMENTS

| | | | |
|---|---|---|---|
| JP | 2001-163188 | * | 6/2001 |
| JP | 2005-297646 A | | 10/2005 |
| JP | A-2006-096257 | | 4/2006 |

OTHER PUBLICATIONS

Office Action mailed on Aug. 16, 2012 issued in corresponding FR application No. 1159260 (and English translation).
Office Action dated Mar. 14, 2014 issued in corresponding JP application No. 2010-231603 (with English translation).

* cited by examiner

*Primary Examiner* — Gary Graham
(74) *Attorney, Agent, or Firm* — Posz Law Group, PLC

(57) ABSTRACT

In a connecting member, a base member includes an installation portion, to which a hook of a wiper arm configured into a U-shape form is adapted to be installed after installation of the base member to a wiper blade. A lock member is rotatably connected to the base member and is adapted to be engaged with an arcuate outer peripheral surface of the hook after installation of the hook to the installation portion. The lock member includes an engaging portion, which is adapted to be engaged with the arcuate outer peripheral surface of the hook to exert a resilient force against the arcuate outer peripheral surface of the hook. The resilient force of the engaging portion is exerted as a rotational force in a locking direction of the lock member against the arcuate outer peripheral surface of the hook.

18 Claims, 5 Drawing Sheets

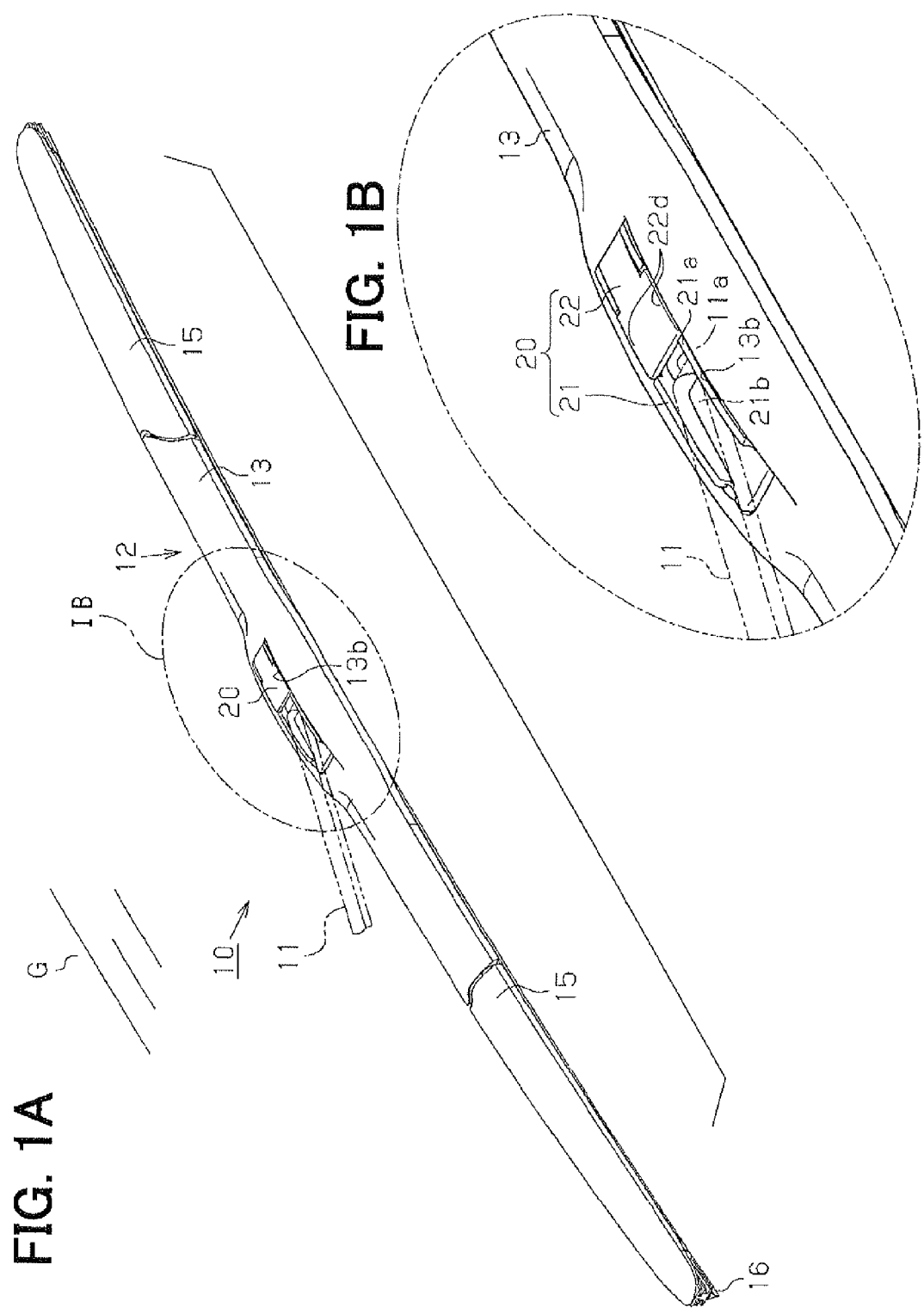

CONNECTING DEVICE FOR WIPER BLADE AND WIPER BLADE HAVING THE SAME

CROSS REFERENCE TO RELATED APPLICATION

This application is based on and incorporates herein by reference Japanese Patent Application No. 2010-231603 filed on Oct. 14, 2010.

BACKGROUND OF THE INVENTION

1. Field of the Invention

The present invention relates to a connecting device for a wiper blade and the wiper blade having the same.

2. Description of Related Art

A wiper of a vehicle (e.g., an automobile) includes a wiper arm and a wiper blade. The wiper arm is swung by a drive force transmitted from a wiper motor upon energization thereof. The wiper blade is supported by a distal end portion of the wiper arm and contacts a wiping surface of, for example, a front glass (windshield). The wiper blade is connected to and is supported by a hook of the wiper arm, which is placed at a distal end portion of the wiper arm and is configured into a U-shape form, through a connecting member (a connecting device). Japanese Unexamined Patent Publication JP2006-096257A teaches such a connecting member, which connects the wiper blade to the wiper arm.

Specifically, an opening is formed in a longitudinal center portion of a lever member (a holding member) of the wiper blade, and a connecting shaft is securely held in the opening to extend between two side walls of the lever member. A base member of the connecting member is installed to the connecting shaft in the opening of the lever member. The base member includes two side walls and an installation portion. The side walls of the base member contact the side walls of the opening of the lever member. At a location between the side walls of the base member, the installation portion is installed to the hook of the wiper arm. The installation portion is located in one longitudinal side portion of the opening of the lever member to receive the connecting shaft of the lever member. At the other longitudinal side portion of the opening of the lever member, an insertion space is formed between the side walls of the base member and is adapted to receive the hook of the wiper arm. Specifically, a turning portion (arcuate portion) of the hook is inserted into the connecting member through the insertion space and is then moved to the installation portion, so that the installation portion is received in the hook.

In this state, when the hook is moved back to the insertion space, which is opposite from the installation portion in the longitudinal direction, the installed state of the connecting member relative to the hook is released. Therefore, a lock member is provided in the connecting member to lock the connecting member to the hook in the installed state where the installation portion is installed to the hook. The lock member is rotatably installed between the side walls of the base member at a longitudinal end portion of the base member, which is opposite from the installation portion. Furthermore, the lock member includes an engaging piece (an engaging portion). The engaging piece is resiliently flexible and is placed at a longitudinal side (installation portion side) of the lock member, which is opposite from a rotational axis of the lock member. After the installation of the installation portion to the hook, the lock member is rotated to close the insertion space, and the engaging piece is engaged to an outer peripheral surface of the arcuate portion of the hook. In this way, the movement of the hook toward the insertion space is limited by the lock member, and the releasing of the connecting member from the hook is limited to lock the connecting member to the hook.

A plate thickness of the hook of the wiper arm may vary depending on its specification. Specifically, the plate thickness of the hook of the wiper arm may be set to be thick (large) according to its specification. Furthermore, the plate thickness of the hook of the wiper arm may become larger due to presence of a size error caused by a tolerance even in the case where the wiper arm is produced using the same specification. When the plate thickness of the hook is increased, a degree of flexion of the engaging piece of the lock member, which contacts the outer peripheral surface of the hook, is increased. In such a case, a reaction force, which is caused by the increase in the flexion of the engaging piece, is exerted in an unlocking direction of the lock member to promote the unlocking of the lock member. As a result, the lock member may be lifted. Specifically, a portion of the lock member upwardly projects from the wiper blade to deteriorate an appearance of the wiper blade.

SUMMARY OF THE INVENTION

The present invention addresses the above disadvantages.

According to the present invention, there is provided a connecting device for a wiper blade that is configured to be connected to a wiper arm through the connecting device. The connecting device includes a base member and a lock member. The base member includes an installation portion, to which a hook of the wiper arm configured into a U-shape form is adapted to be installed after installation of the base member to the wiper blade. The lock member is rotatably connected to the base member and is adapted to be engaged with an arcuate outer peripheral surface of the hook after installation of the hook to the installation portion. The lock member is rotatable between a locking position and an unlocking position. In the locking position, the lock member is engaged with the arcuate outer peripheral surface of the hook upon rotation of the lock member in a locking direction to lock the hook against the installation portion and thereby to disable relative movement between the installation portion and the hook. In the unlocking position, the lock member is disengaged from the arcuate outer peripheral surface of the hook upon rotation of the lock member in an unlocking direction, which is opposite from the locking direction, to enable detachment of the hook from the installation portion. The lock member includes an engaging portion, which is adapted to be engaged with the arcuate outer peripheral surface of the hook to exert a resilient force against the arcuate outer peripheral surface of the hook after the installation of the hook to the installation portion. The resilient force of the engaging portion is exerted as a rotational force in the locking direction of the lock member against the arcuate outer peripheral surface of the hook when the lock member is placed in the locking position.

According to the present invention, there is also provided a wiper blade, which includes a wiper strip, a holder member and the connecting device described above. The wiper strip is elongated and is adapted to wipe a wiping surface. The holder member directly or indirectly holds the wiper strip. The connecting device is installed to the holder member.

BRIEF DESCRIPTION OF THE DRAWINGS

The invention, together with additional objectives, features and advantages thereof, will be best understood from the following description, the appended claims and the accompanying drawings in which:

FIG. 1A is a perspective view showing a wiper according to an embodiment of the present invention;

FIG. 1B is a partial enlarged perspective view showing an area IB of FIG. 1A;

DETAILED DESCRIPTION OF THE INVENTION

An embodiment of the present invention will be described with reference to the accompanying drawings.

FIG. 1A shows a wiper 10 of a vehicle (e.g., an automobile), which is adapted to wipe, for example, rain droplets adhered to a front glass (windshield) of the vehicle. The wiper 10 includes a wiper arm 11 and a wiper blade 12. The wiper blade 12 is supported by a distal end portion of the wiper arm 11 and contacts a wiping surface G of the front glass. When the wiper arm 11 is swung by a drive force, which is generated by a wiper motor (not shown) upon energization thereof, the wiper blade 12 is swung to wipe the wiping surface G of the front glass.

Figure 3:
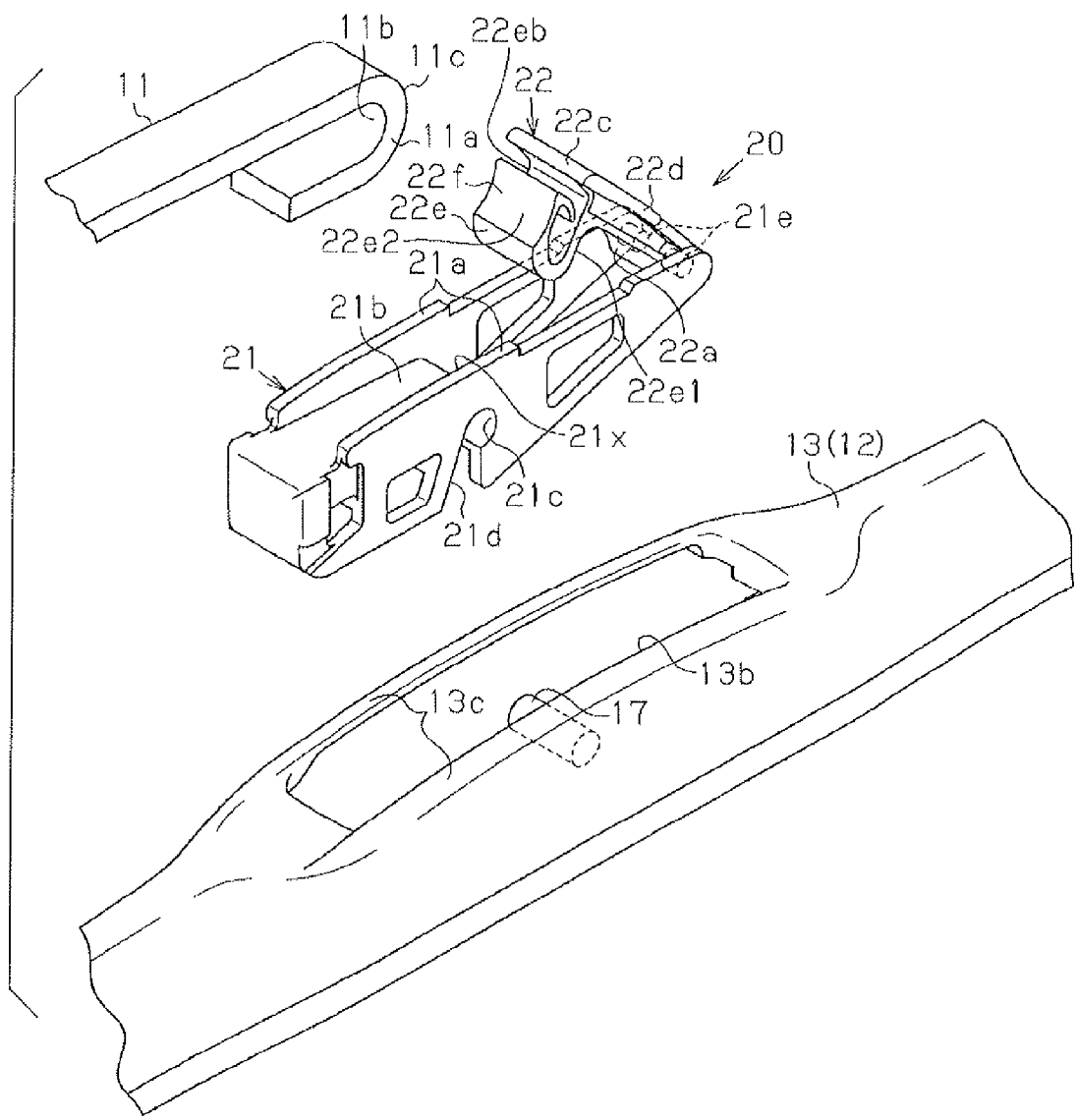
FIG. 3 is a partial perspective view showing a wiper arm, a connecting member and a main lever of the wiper before assembling thereof according to the embodiment.

The wiper arm 11 and the wiper blade 12 are detachably connected to each other through a connecting member (serving as a connecting device) 20 shown in FIG. 3. Now, structures of the wiper arm 11 and the wiper blade 12 will be described. The wiper arm 11 is configured into an elongated plate form at a distal end section thereof. The wiper arm 11 has a hook 11a, which is formed in the distal end section and is bent into a U-shape form. The hook 11a is configured to project toward a lower surface side (a wiping surface G side) of the wiper arm 11.

Figure 2A:
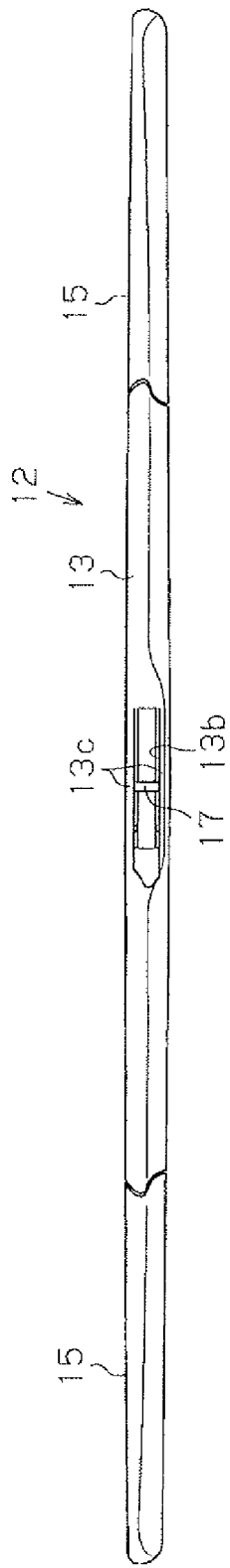
FIG. 2A is a plan view of a wiper blade of the wiper shown in FIG. 1.
Figure 2B:
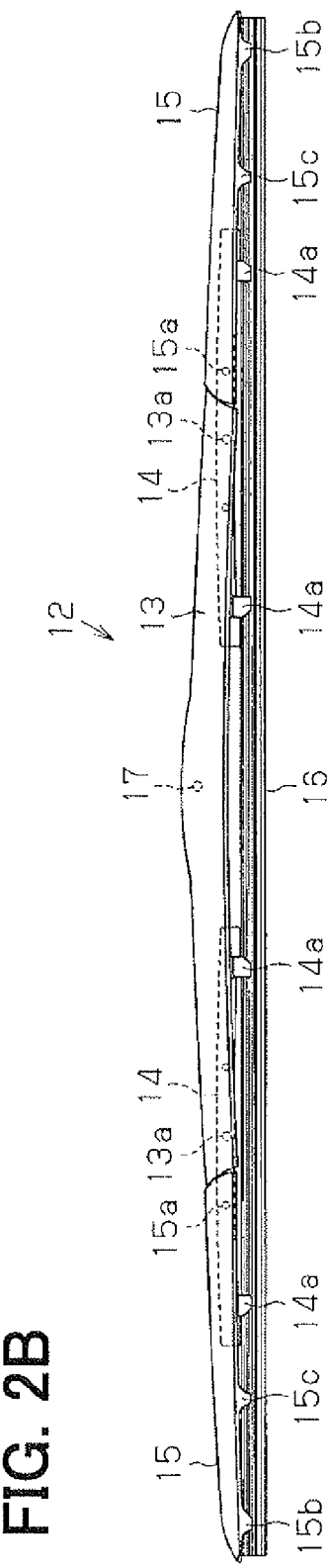
FIG. 2B is a side view of the wiper blade shown in FIG. 2A.

As shown in FIGS. 2A and 2B, the wiper blade 12 includes a main lever (a holder member) 13, two yoke levers 14, two movable cover members 15 and a wiper strip 16. The wiper strip 16 is located on a lower side of the main lever 13 in a top-to-bottom direction of the wiper blade 12 (a direction that is generally perpendicular to the wiping surface G). A rotational shaft 13a is provided at each of two opposed longitudinal end portions of the main lever 13. A longitudinal center portion (rotatable connecting portion) of each yoke lever 14 is installed to the corresponding rotational shaft 13a, so that the yoke lever 14 is rotatable, i.e., pivotable relative to the main lever 13.

A base end portion of each movable cover member 15 is installed to a corresponding portion of the adjacent yoke lever 14, which is slightly longitudinally outwardly displaced from the rotatable connecting portion of the yoke lever 14 located at the longitudinal center portion of the yoke lever 14, through a corresponding rotational shaft 15a, so that the movable cover member 15 is rotatable, i.e., pivotable relative to the yoke lever 14. Two clamping claws 14a, which are opposed to each other in a widthwise direction (i.e., a direction that is perpendicular to the longitudinal direction of the wiper blade 12 and is generally parallel to the wiping surface G) of the wiper blade 12, are formed at each of two opposed longitudinal end portions of each yoke lever 14. Furthermore, two clamping claws 15b, which are opposed to each other in the widthwise direction of the wiper blade 12, are formed at a longitudinally outer end portion of each movable cover member 15, which is opposite from the main lever 13 in the longitudinal direction of the wiper blade 12. The clamping claws 14a and the clamping claws 15b are arranged at predetermined longitudinal intervals and clamp the wiper strip 16. Each movable cover member 15 further includes two limiting pieces 15c, which are longitudinally placed between the clamping claws 15b of the movable cover member 15 and the longitudinally outer clamping claws 14a of the adjacent yoke lever 14 that is adjacent to the movable cover member 15. The limiting pieces 15c limit movement of the wiper strip 16 in the widthwise direction of the wiper blade 12.

In a plan view shown in FIG. 2A, an opening 13b is formed in a longitudinal center portion of the main lever 13 in the longitudinal direction of the wiper blade 12 such that the opening 13b extends through the main lever 13 in the top-to-bottom direction of the wiper blade 12 and is configured into an elongated rectangular form having long sides, which extend in the longitudinal direction of the wiper blade 12. A connecting shaft 17, which is configured into a cylindrical form, is secured such that the connecting shaft 17 extends between first and second side walls 13c of the opening 13b, which are opposed to each other in the widthwise direction. The connecting member 20 of FIG. 3, which is adapted to be connected with the hook 11a of the wiper arm 11, is fitted into the opening 13b such that the connecting member 20 is rotatable relative to the connecting shaft 17.

Figure 4A:
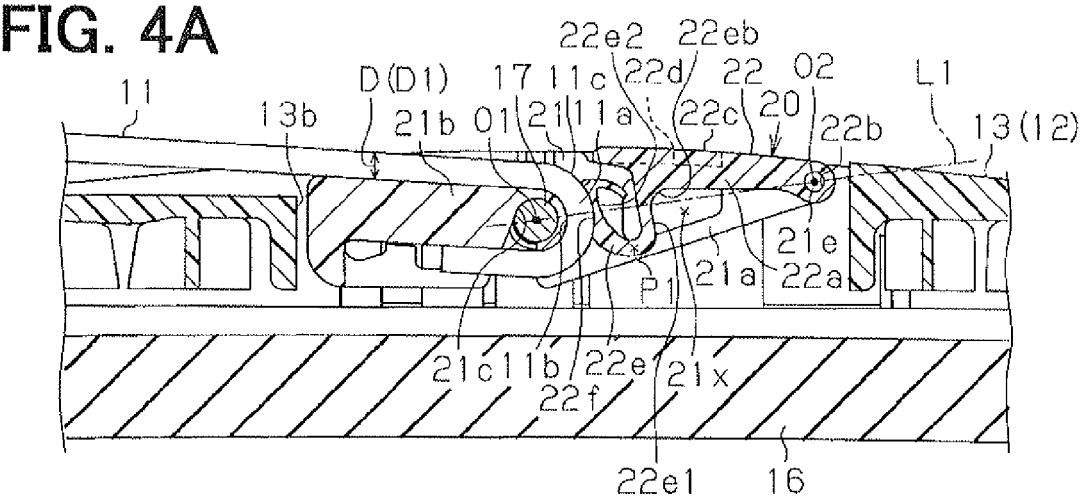
FIG. 4A is a partial cross-sectional view showing the connecting member connected to a hook of the wiper arm having a small plate thickness.

As shown in FIGS. 3 and 4A, the connecting member 20 includes a base member 21 and a lock member 22, each of which is made of a resin material. The lock member 22 is installed to and is rotatably connected to the base member 21. The base member 21 includes first and second side walls 21a and an installation portion 21b. The first and second side walls 21a contact the first and second side walls 13c, respectively, of the opening 13b of the main lever 13. The installation portion 21b is located between the first and second side walls 21a, and the hook 11a of the wiper arm 11 is installed to the installation portion 21b.

A support hole 21c and a guide groove 21d are formed in the first and second side walls 21a and the installation portion 21b. The support hole 21c extends through the first and second side walls 21a and the installation portion 21b in the widthwise direction. The guide groove 21d is notched, i.e., is recessed upwardly from the lower side of the first and second side walls 21a and the installation portion 21b to the support hole 21c, so that the guide groove 21d is connected to the support hole 21c. The connecting shaft 17 of the main lever 13 is fitted into the support hole 21c through the guide groove 21d, and thereby the base member 21 (the connecting member 20) is connected to the connecting shaft 17 such that the base member 21 (the connecting member 20) is rotatable about the connecting shaft 17. The installation portion 21*b* extends from a location around the support hole 21*c* toward one longitudinal side of the opening 13*b* and is configured to coincide with a shape of an inner peripheral surface 11*b* of the hook 11*a*. At the other longitudinal side, which is opposite from the installation portion 21*b*, an insertion space 21*x* is formed in the base member 21. The insertion space 21*x* receives a turning portion, i.e., an arcuate portion (distal end portion) of the hook 11*a*. Specifically, the turning portion of the hook 11*a* is inserted through the insertion space 21*x* and is then moved toward the installation portion 21*b*, so that the installation portion 21*b*, which receives the connecting shaft 17, is received in the hook 11*a*.

First and second support projections 21*e* are formed at the other longitudinal end portions, respectively, of the first and second side walls 21*a*, between which the insertion space 21*x* is formed. The support projections 21*e* project from inner surfaces, respectively, of the first and second side walls 21*a* to oppose with each other in the widthwise direction of the wiper blade 12. The lock member 22 is installed to, i.e., is connected to the support projections 21*e* such that the lock member 22 is rotatable about the support projections 21*e* in the top-to-bottom direction of the wiper blade 12 between an unlocking position (releasing position) and a locking position thereof. Specifically, a fitting hole 22*b* is formed in one longitudinal end portion of a base portion 22*a* of the lock member 22. The support projections 21*e* are fitted into the fitting hole 22*b*.

An upper wall (a top wall) 22*c*, which is configured into an elongated rectangular form, is provided in the lock member 22 at an upper side of the base portion 22*a* to close an opening of the insertion space 21*x*. First and second limiting portions 22*d* are formed in the upper wall 22*c* such that the first and second limiting portions 22*d* outwardly project from the upper wall 22*c* in the widthwise direction and are adapted to contact an upper end portions, respectively, of the first and second side walls 21*a* to limit further rotation of the lock member 22 into the insertion space 21*x* (in the locking direction), as shown in FIGS. 1A and 1B.

An engaging piece (an engaging portion) 22*e*, which is resiliently flexible, is integrally formed in the other longitudinal end portion of the base portion 22*a* of the lock member 22. The engaging piece 22*e* has a width, which is measured in the widthwise direction of the wiper blade 12 and is generally the same as that of the hook 11*a* of the wiper arm 11. In the lateral view taken in the widthwise direction of the wiper blade 12, the engaging piece 22*e* extends downward and then upward to have a U-shape form. More specifically, with reference to FIG. 3, the engaging piece 22*e* is configured such that a first section 22*e*1 extends downward from a base end part 22*eb* located at the longitudinal end portion of the base portion 22*a* that is opposite from the fitting hole 22*b* in the longitudinal direction, and a second section 22*e*2 extends continuously upward from a lower end of the first section 22*e*1 toward the installation portion 21*b* to have the U-shape form. Thereby, a turning connection between the first section 22*e*1 and the second section 22*e*2 forms a bottom of the U-shape form, and a free end of the second section 22*e*2 is located on an upper side of the bottom of the U-shape form in the top-to-bottom direction. The engaging piece 22*e* has a curved surface (an arcuate recess) 22*f*, which is located in the upwardly extending second section 22*e*2 located immediately after the bottom of the U-shape form and is configured to coincide with an outer peripheral surface (an arcuate outer peripheral surface) 11*c* of the arcuate portion of the hook 11*a*. When the hook 11*a* of the wiper arm 11 is installed to the installation portion 21*b* of the base member 21, the curved surface 22*f* of the engaging piece 22*e* resiliently contacts the outer peripheral surface 11*c* of the hook 11*a* to resiliently clamp the arcuate portion of the hook 11*a* between the engaging piece 22*e* and the installation portion 21*b*.

The connecting member 20, which includes the lock member 22 and the base member 21, is inserted into the opening 13*b* of the wiper blade 12 (more specifically, the main lever 13) and is installed to the connecting shaft 17. Then, the lock member 22 is rotated to its unlocking position to open the same. Thereafter, the hook 11*a* of the wiper arm 11 is inserted into the insertion space 21*x*, and the installation portion 21*b* is installed to the hook 11*a*. Then, when the lock member 22 is rotated to the locking position to close the insertion space 21*x*, the engaging piece 22*e* is resiliently engaged with the outer peripheral surface 11*c* of the arcuate portion of the hook 11*a*. In this way, the hook 11*a* is clamped between the engaging piece 22*e* and the installation portion 21*b* and is placed in the locked state, in which the hook 11*a* is not removable from the connecting member 20. Thereby, the installed state of the connecting member 20 relative to the hook 11*a* cannot be released, that is, the installed state of the wiper blade 12 relative to the hook 11*a* cannot be released. Furthermore, the resilient force of the engaging piece 22*e* is also exerted as the rotational force, which rotates the lock member 22 in the locking direction. At the time of removing the wiper blade 12 from the hook 11*a*, the lock member 22 is rotated in the unlocking direction all the way to the unlocking position, so that the installation portion 21*b* can be released from the hook 11*a*. In this way, the wiper blade 12 can be easily removed from the hook 11*a*.

Figure 4B:
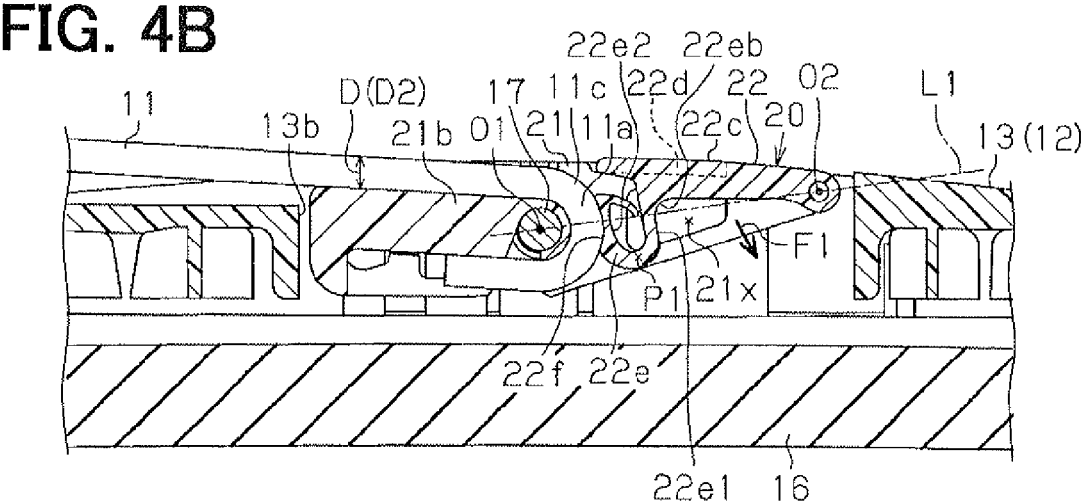
FIG. 4B is a partial cross-sectional view showing the connecting member of FIG. 4A connected to the hook of the wiper arm having a larger plate thickness, which is larger than that of FIG. 4A.

The hook 11*a* of the wiper arm 11 has a generally constant plate thickness D along an entire extent thereof. In this instance, the plate thickness D of the hook 11*a* is measured in a direction perpendicular to a plane of a planar upper section of the hook 11*a*. The plate thickness D of the hook 11*a* may vary depending on its specification. Specifically, the plate thickness D of the hook 11*a* of the wiper arm 11 may be set to be thick (large) according to its specification. Furthermore, the plate thickness D of the hook 11*a* of the wiper arm 11 may become thicker (larger) due to presence of a size error caused by a tolerance even in the case where the wiper arm 11 is produced using the same specification. Thus, it is necessary to generate a sufficient level of the resilient force from the engaging piece 22*e* of the lock member 22 to compensate any of such tolerable variations in the plate thickness D of the hook 11*a* of the wiper arm 11. Therefore, according to the present embodiment, the sizes of the lock member 22, which includes the engaging piece 22*e*, are set such that the sufficient level of the resilient force is exerted from the engaging piece 22*e* of the lock member 22 to the hook 11*a* having the smallest plate thickness D1, as shown in FIG. 4A. However, a degree of flexion of the engaging piece 2*e* will be increased for the hook 11*a* having a larger plate thickness D2, which is larger than the plate thickness D1, as shown in FIG. 4B.

Figure 5A:
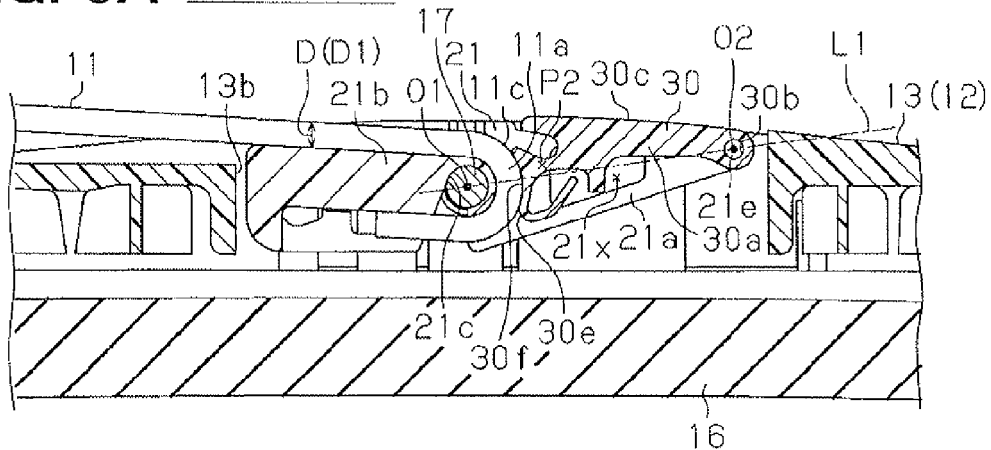
FIG. 5A is a partial cross-sectional view showing a connecting member connected to a hook of a wiper arm having a small plate thickness in a comparative example.
Figure 5B:
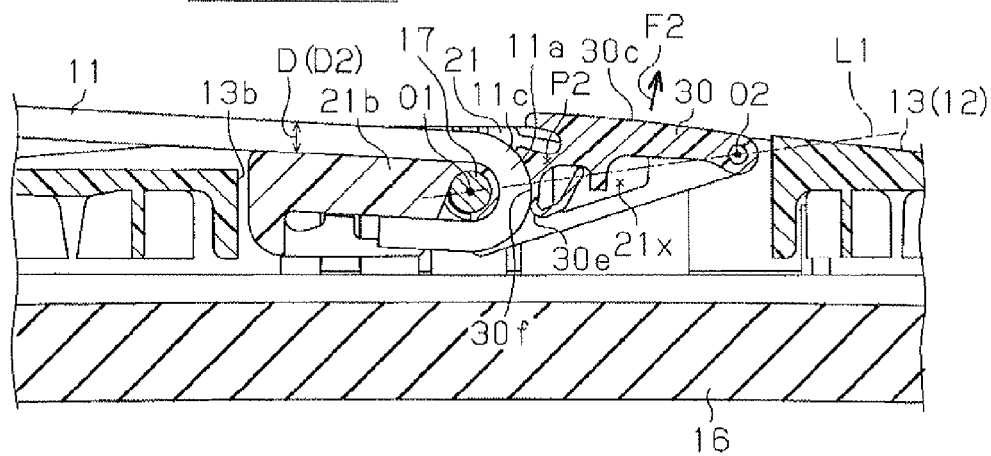
FIG. 5B is a partial cross-sectional view showing the connecting member of FIG. 5A connected to the hook of the wiper arm having a larger plate thickness, which is larger than that of FIG. 5A in the comparative example.

FIGS. 5A and 5B show a comparative example of the wiper blade to be compared with the wiper blade 12 of the present embodiment. The comparative example shown in FIGS. 5A and 5B is constructed such that a lock member 30 is lifted in the case where the hook 11*a* of the wiper arm 11 has the larger plate thickness D2.

Similar to the lock member 22 of the present embodiment, the lock member 30 of the comparative example includes a base portion 30*a*, a fitting hole 30*b*, an upper wall 30*c*, an engaging piece 30*e* and a curved surface 30*f*. However, a shape of the engaging piece 30*e* differs from that of the present embodiment. Specifically, the engaging piece 30*e* extends longitudinally from the base portion 30a toward the installation portion 21b side (the hook 11a side) and then extends downward such that the curved surface 30f is located in this downwardly extending portion. In the case of the lock member 30, when the hook 11a has the plate thickness D1, the lifting of the lock member 30 does not occur, as shown in FIG. 5A. However, when the hook 11a has the larger plate thickness D2, the lifting of the lock member 30 occurs, as shown in FIG. 5B.

This is probably due to the following reason. Specifically, a main flexing point P2 of the engaging piece 30e of the lock member 30 is located on an unlocking side (the upper side) of an imaginary straight line L1, which connects between a center O1 of the arc of the outer peripheral surface 11c of the arcuate portion of the hook 11a (the center O1 of the arc being also a center of the support hole 21c of the base member 21 and a center of the connecting shaft 17) and a rotational center (rotational axis) O2 of the lock member 30 (the rotational center O2 being also a center of the fitting hole 30b and a center of the support projections 21e). That is, in the case of the larger plate thickness D2 of the hook 11a, a distance between the outer peripheral surface 11c and the rotational center O2 of the lock member 30 becomes shorter, so that the engaging piece 30e is largely flexed about the flexing point P2 to increase a force F2, which rotates the lock member 30 in the unlocking direction (upward direction). Thereby, a radially outer end portion of the upper wall 30c, which is opposite from the rotational center O2, is lifted upward.

Figure 5C:
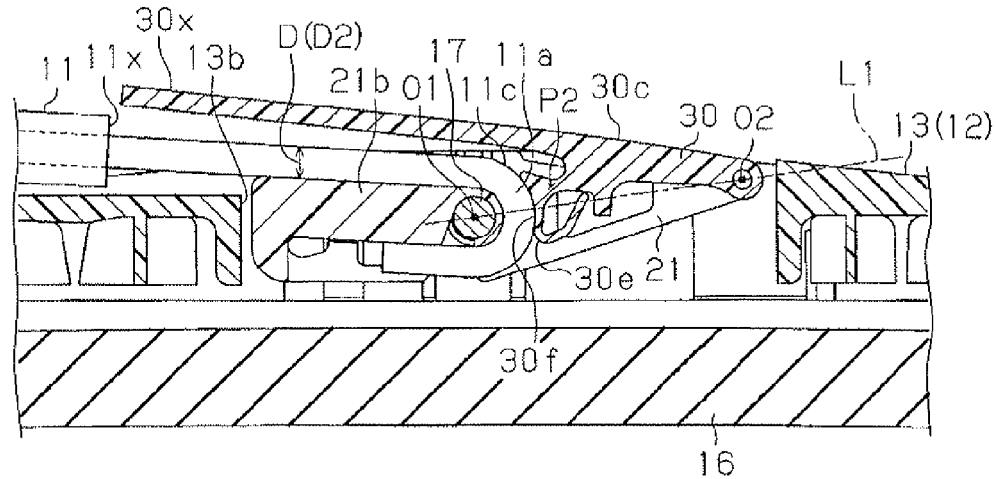
FIG. 5C is a partial cross-sectional view showing a variation of the connecting member of FIGS. 5A and 5B, which has a cover and is connected to the hook of the wiper arm having the larger plate thickness like in the case of FIG. 5B.

Particularly in a case of a variation shown in FIG. 5C where the wiper arm 11 has a step portion 11x on a base end side of the hook 11a, and a cover 30x extends from a wiper arm 11 side end portion (an end portion opposite from the rotational axis) of the upper wall 30c of the lock member 30, the lifting of the lock member 30 becomes particularly notable (prominent).

Unlike the comparative example, according to the present embodiment, as shown in FIGS. 4A and 4B, a main flexing point P1 of the engaging piece 22e of the lock member 22 is located on the locking side (lower side) of the straight line L1, which connects between the center O1 of the arc of the outer peripheral surface 11c of the arcuate portion of the hook 11a and the rotational center (rotational axis) O2 of the lock member 30. More specifically, the engaging piece 22e of the lock member 22 includes the first section 22e1, which extends from the base end part 22eb of the engaging piece 22e into the insertion space 21x in the locking position of the lock member 22, and the second section 22e2, which extends continuously from the first section 22e1 and is turned toward the installation portion 21b in the locking position of the lock member 22. The main flexing point P1 is located in the turning connection between the first section 22e1 and the second section 22e2. The engaging piece 22e of the lock member 22 is flexed by the outer peripheral surface 11c of the hook 11a relative to the base end part 22eb of the engaging piece 22e when the lock member 22 is rotated in the locking direction from the unlocking position to the locking position. In the case of the larger plate thickness D2 of the hook 11a, the distance between the outer peripheral surface 11c and the rotational center O2 of the lock member 22 becomes shorter, so that the engaging piece 22e is largely flexed about the flexing point P1 to increase a force F1, which rotates the lock member 22 in the locking direction (downward direction). Thereby, the lifting of the lock member 22 (the lifting similar to that of the above comparative example) does not occur, and thereby the unintentional unlocking of the lock member 22 can be limited.

Furthermore, when the force F1, which rotates the lock member 22 in the locking direction (downward direction), is increased, the lock member 22 could possibly be sunk into the insertion space 21x located between the first and second side walls 21a. However, in such a case, the limiting portions 22d, which are formed in the upper wall 22c, contact the upper end portions of the first and second side walls 21a, so that the further rotation of the lock member 22 in the locking direction from the locking position (toward the inside of the insertion space 21x) is advantageously limited.

Figure 4C:
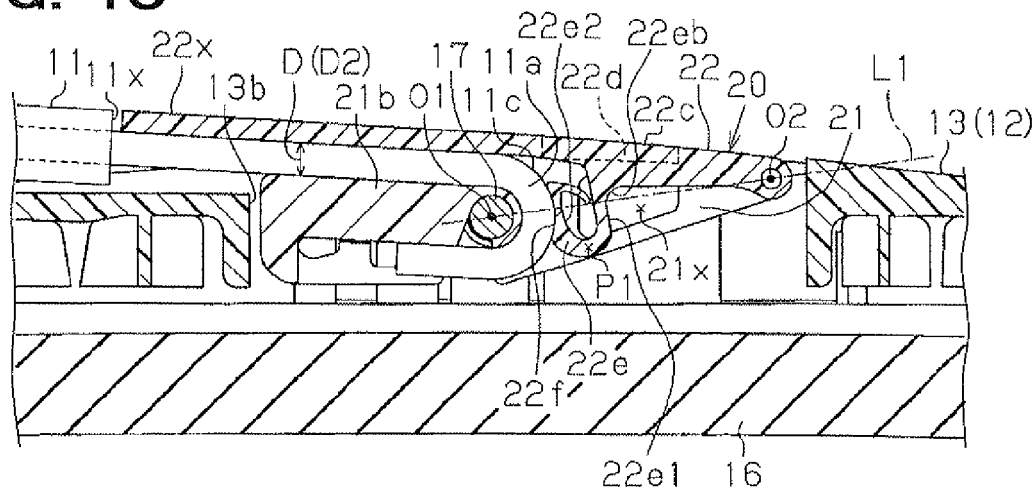
FIG. 4C is a partial cross-sectional view showing a variation of the connecting member of FIGS. 4A and 4B, which has a cover and is connected to the hook of the wiper arm having the larger plate thickness like in the case of FIG. 4B.

Furthermore, as shown in FIG. 4C, in a case of a variation (a variation, which is varied from the structure of FIGS. 4A and 4B) where a cover 22x extends from a wiper arm 11 side end portion (an end portion opposite from the rotational axis) of the upper wall 22c of the lock member 22, slight lifting of the lock member 22 may become particularly notable. However, in the case of the lock member 22 of the present embodiment, even when the hook 11a has the larger plate thickness D2, the lifting of the lock member 22 does not occur. Therefore, when the above described structure of the present embodiment is applied to the lock member 22 having the cover 22x, it is particularly advantageous. Therefore, even when the plate thickness D2 of the hook 11a is different from the other one (e.g., the plate thickness D1), the cover 22x can substantially contact the upper surface of the wiper arm 11 from the hook 11a up to the step portion 11x. Therefore, a gap of the step portion 11x of the wiper arm 11 can be absorbed by, i.e., covered with the cover 22x, and thereby it is possible to always provide a good appearance of the wiper blade 12.

Next, advantages of the present embodiment will be described.

(1) The base member 21 of the connecting member 20, which is installed to the wiper blade 12, is installed to the hook 11a of the wiper arm 11 through the installation portion 21b, and the lock member 22 of the connecting member 20 is installed to the base member 21 in such a manner that the lock member 22 is rotatable between the locking position and the unlocking position. The engaging piece 22e of the lock member 22 is resiliently engaged with the outer peripheral surface 11c of the arcuate portion of the hook 11a to place the hook 11a in the locked state. The lock member 22 is constructed such that in the locking position, the resilient force of the engaging piece 22e is exerted as the rotational force in the locking direction (the locking direction being the same as the direction of the arrow F1) to urge the lock member 22 in the locking direction. Therefore, the lock member 22 is urged in the locking direction while allowing a change in the degree of flexing of the lock member 22 caused by the increase in the plate thickness D of the hook 11a. Thus, even when the plate thickness D of the hook 11a is increased, it is possible to limit the lifting of the lock member 22. That is, regardless of the plate thickness D of the hook 11a, the portion of the lock member 22 does not project from the wiper blade 12, so that the good appearance of the wiper blade 12 can be always achieved according to the present embodiment. Furthermore, the unintentional unlocking of the lock member 22 can be limited.

(2) The engaging piece 22e of the lock member 22 is constructed such that the main flexing point P1 of the engaging piece 22e is located on the locking side (the locking side being the same as the side indicated by the arrow F1) of the straight line L1, which connects between the center O1 of the arc of the outer peripheral surface 11c of the arcuate portion of the hook 11e and the rotational center (rotational axis) O2 of the lock member 30. That is, when the plate thickness D of the hook 11a is increased, the lock member 22 is further rotated in the locking direction (the downward direction) due to the change in the degree of the flexing of the engaging piece 22e. Therefore, the lifting of the lock member 22, which could be caused by the increase in the plate thickness D of the hook 11a, can be easily and reliably limited.

(3) The lock member 22 includes the limiting portions 22d, which limit the further rotation of the lock member 22 in the locking direction (the locking direction being the same as the direction of the arrow F1), which is caused by the resilient force of the engaging piece 22e. That is, when the plate thickness D of the hook 11a is increased, the lock member 22 further increases the rotational force in the locking direction (the downward direction) to possibly cause the sinking of the lock member 22 from the locking position. However, the limiting portions 22d can limit the sinking of the lock member 22 from the locking position. The limiting portions 22d engage the first and second side walls 21a of the base member 21, between which the engaging piece 22e is located. Therefore, the rotation of the lock member 22 in the locking direction can be reliably limited by the limiting portions 22d.

(4) In the case of the lock member 22 of FIG. 4C where the cover 22x, which covers the portion of the upper surface of the wiper arm 11, extends toward the wiper arm side, when the lifting of the lock member 22 occurs, the lifting of the cover 22x, particularly the free end portion of the cover 22x becomes notable. Therefore, when the above described structure of the present embodiment is applied to the lock member 22 having the cover 22x, it is particularly advantageous.

The above embodiment of the present invention may be modified as follows.

The structure of the connecting member 20 of the above embodiment, specifically, the shapes of the base member 21 and the lock member 22 may be modified in an appropriate manner.

For example, in the lock member 22, the meandering configuration of the engaging piece 22e may be changed to any other appropriate one. Also, the engaging piece 22e may be divided into a plurality of pieces, which are arranged one after another in the widthwise direction. Furthermore, in the above embodiment, the engaging piece 22e is constructed such that the curved surface 22f of the engaging piece 22e is engaged with the arcuate outer peripheral surface 11c of the hook 11a. Alternatively, the outer peripheral surface 11c of the hook 11a may be configured to have one or more planar surfaces, and the engaging piece 22e may be configured to engage (contact) with such an outer peripheral surface(s) 11c of the hook 11a. Furthermore, in the above embodiment, the rotation of the lock member 22 is limited by the limiting portions 22d that are respectively provided to the two lateral sides, which are opposed to each other in the widthwise direction while the engaging piece 22e is held therebetween. Alternatively, the structure of limiting the rotation of the lock member 22 may be modified in any appropriate manner or may be eliminated, if not required.

The structure of the wiper 10 of the above embodiment may be further modified in an appropriate manner within the scope and spirit of the present invention.

For example, in the wiper blade 12, the main lever 13, the two yoke levers 14, the two movable cover members 15 are provided. However, this structure may be appropriately change. For instance, the number of the levers and/or the number of the cover members may be changed, or the cover members may be eliminated.

What is claimed is:

1. A connecting device for a wiper blade that is configured to be connected to a wiper arm through the connecting device, the connecting device comprising:
a base member that includes an installation portion, to which a hook of the wiper arm configured into a U-shape form is adapted to be installed after installation of the base member to the wiper blade; and
a lock member that is rotatably connected to the base member and is adapted to be engaged with an arcuate outer peripheral surface of the hook after installation of the hook to the installation portion, wherein:
the lock member is rotatable between:
a locking position, in which the lock member is engaged with the arcuate outer peripheral surface of the hook upon rotation of the lock member in a locking direction to lock the hook against the installation portion and thereby to disable relative movement between the installation portion and the hook; and
an unlocking position, in which the lock member is disengaged from the arcuate outer peripheral surface of the hook upon rotation of the lock member in an unlocking direction, which is opposite from the locking direction, to enable detachment of the hook from the installation portion;
the lock member includes an engaging portion, which is adapted to be engaged with the arcuate outer peripheral surface of the hook to exert a resilient force against the arcuate outer peripheral surface of the hook after the installation of the hook to the installation portion;
the resilient force of the engaging portion is exerted as a rotational force in the locking direction of the lock member against the arcuate outer peripheral surface of the hook when the lock member is placed in the locking position;
the engaging portion of the lock member has a flexing point, about which the engaging portion is flexed by the arcuate outer peripheral surface of the hook relative to a base end part of the engaging portion when the lock member is rotated in the locking direction from the unlocking position to the locking position;
a center of an arc of the arcuate outer peripheral surface of the hook and a rotational axis of the lock member are located along an imaginary straight line after the installation of the hook to the installation portion; and
the flexing point of the engaging portion of the lock member is placed at a corresponding position, which is spaced from the imaginary straight line in the locking direction of the lock member, when the lock member is placed in the locking position.

2. The connecting device according to claim 1, wherein the lock member includes at least one limiting portion, which is adapted to be engaged with the base member when the lock member is placed in the locking position to limit further rotation of the lock member in the locking direction upon exertion of the resilient force of the engaging portion against the arcuate outer peripheral surface of the hook.

3. The connecting device according to claim 1, wherein:
the base member includes first and second side walls, which are opposed to each other in a direction perpendicular to a longitudinal direction of the base member and extend in the longitudinal direction of the base member from the installation portion;
the first and second side walls of the base member form an insertion space, through which the hook is inserted to the installation portion at a time of installing the hook to the installation portion; and
the lock member includes an upper wall, which is located above the base end part of the engaging portion and closes an opening of the insertion space in the locking position of the lock member.

4. The connecting device according to claim 3, wherein the upper wall of the lock member includes first and second limiting portions, which are adapted to be engaged with the first and second side walls, respectively, of the base member when the lock member is placed in the locking position to limit further rotation of the lock member in the locking direction upon exertion of the resilient force of the engaging portion against the arcuate outer peripheral surface of the hook.

5. The connecting device according to claim 3, wherein the engaging portion of the lock member includes:
a first section, which extends from the base end part of the engaging portion into the insertion space in the locking position of the lock member; and
a second section, which extends continuously from the first section and is turned toward the installation portion in the locking position of the lock member; and
the flexing point is located in a turning connection between the first section and the second section.

6. The connecting device according to claim 5, wherein the second section of the engaging portion of the lock member includes an arcuate recess, which is configured to coincide with the arcuate outer peripheral surface of the hook.

7. The connecting device according to claim 1, wherein the lock member includes a cover, which extends toward the wiper arm to cover a portion of an upper surface of the wiper arm in the locking position of the lock member.

8. A wiper blade comprising:
a wiper strip that is elongated and is adapted to wipe a wiping surface;
a holder member that directly or indirectly holds the wiper strip; and
the connecting device of claim 1, which is installed to the holder member.

9. The wiper blade according to claim 8, wherein:
the wiper strip is located on a lower side of the holder member in a top-to-bottom direction of the holder member;
the holder member includes an opening that is placed in a center portion of the holder member in a longitudinal direction of the holder member and extends through the holder member in the top-to-bottom direction; and
the base member of the connecting device is installed in the opening of the holder member.

10. A connecting device for a wiper blade that is configured to be connected to a wiper arm through the connecting device, the connecting device comprising:
a base member that includes an installation portion, to which a hook of the wiper arm configured into a U-shape form is adapted to be installed after installation of the base member to the wiper blade; and
a lock member that is rotatably connected to the base member and is adapted to be engaged with an arcuate outer peripheral surface of the hook after installation of the hook to the installation portion, wherein:
the lock member is rotatable between:
a locking position, in which the lock member is engaged with the arcuate outer peripheral surface of the hook upon rotation of the lock member in a locking direction to lock the hook against the installation portion and thereby to disable relative movement between the installation portion and the hook; and
an unlocking position, in which the lock member is disengaged from the arcuate outer peripheral surface of the hook upon rotation of the lock member in an unlocking direction, which is opposite from the locking direction, to enable detachment of the hook from the installation portion;
the lock member includes an engaging portion, which is adapted to be engaged with the arcuate outer peripheral surface of the hook to exert a resilient force against the arcuate outer peripheral surface of the hook after the installation of the hook to the installation portion;
the engaging portion of the lock member has a flexing point, about which the engaging portion is flexed by the arcuate outer peripheral surface of the hook relative to a base end part of the engaging portion when the lock member is rotated in the locking direction from the unlocking position to the locking position;
a center of an arc of the arcuate outer peripheral surface of the hook and a rotational axis of the lock member are located along an imaginary straight line after the installation of the hook to the installation portion; and
the flexing point of the engaging portion of the lock member is placed at a corresponding position, which is spaced from the imaginary straight line in the locking direction of the lock member, when the lock member is placed in the locking position.

11. The connecting device according to claim 10, wherein the lock member includes at least one limiting portion, which is adapted to be engaged with the base member when the lock member is placed in the locking position to limit further rotation of the lock member in the locking direction upon exertion of the resilient force of the engaging portion against the arcuate outer peripheral surface of the hook.

12. The connecting device according to claim 10, wherein:
the base member includes first and second side walls, which are opposed to each other in a direction perpendicular to a longitudinal direction of the base member and extend in the longitudinal direction of the base member from the installation portion;
the first and second side walls of the base member form an insertion space, through which the hook is inserted to the installation portion at a time of installing the hook to the installation portion; and
the lock member includes an upper wall, which is located above the base end part of the engaging portion and closes an opening of the insertion space in the locking position of the lock member.

13. The connecting device according to claim 12, wherein the upper wall of the lock member includes first and second limiting portions, which are adapted to be engaged with the first and second side walls, respectively, of the base member when the lock member is placed in the locking position to limit further rotation of the lock member in the locking direction upon exertion of the resilient force of the engaging portion against the arcuate outer peripheral surface of the hook.

14. The connecting device according to claim 12, wherein the engaging portion of the lock member includes:
a first section, which extends from the base end part of the engaging portion into the insertion space in the locking position of the lock member; and
a second section, which extends continuously from the first section and is turned toward the installation portion in the locking position of the lock member; and
the flexing point is located in a turning connection between the first section and the second section.

15. The connecting device according to claim 14, wherein the second section of the engaging portion of the lock member includes an arcuate recess, which is configured to coincide with the arcuate outer peripheral surface of the hook.

16. The connecting device according to claim 10, wherein the lock member includes a cover, which extends toward the wiper arm to cover a portion of an upper surface of the wiper arm in the locking position of the lock member.

17. A wiper blade comprising:

a wiper strip that is elongated and is adapted to wipe a wiping surface;

a holder member that directly or indirectly holds the wiper strip; and the connecting device of claim 10, which is installed to the holder member.

18. The wiper blade according to claim 17, wherein:

the wiper strip is located on a lower side of the holder member in a top-to-bottom direction of the holder member;

the holder member includes an opening that is placed in a center portion of the holder member in a longitudinal direction of the holder member and extends through the holder member in the top-to-bottom direction; and the base member of the connecting device is installed in the opening of the holder member.

* * * * *